July 30, 1940.   J. A. COXE   2,209,598
FISHING REEL
Filed March 2, 1935   10 Sheets-Sheet 1

Inventor:
Joseph A. Coxe
By Freeman, Sweet, Albrecht & Weidman
Attorneys

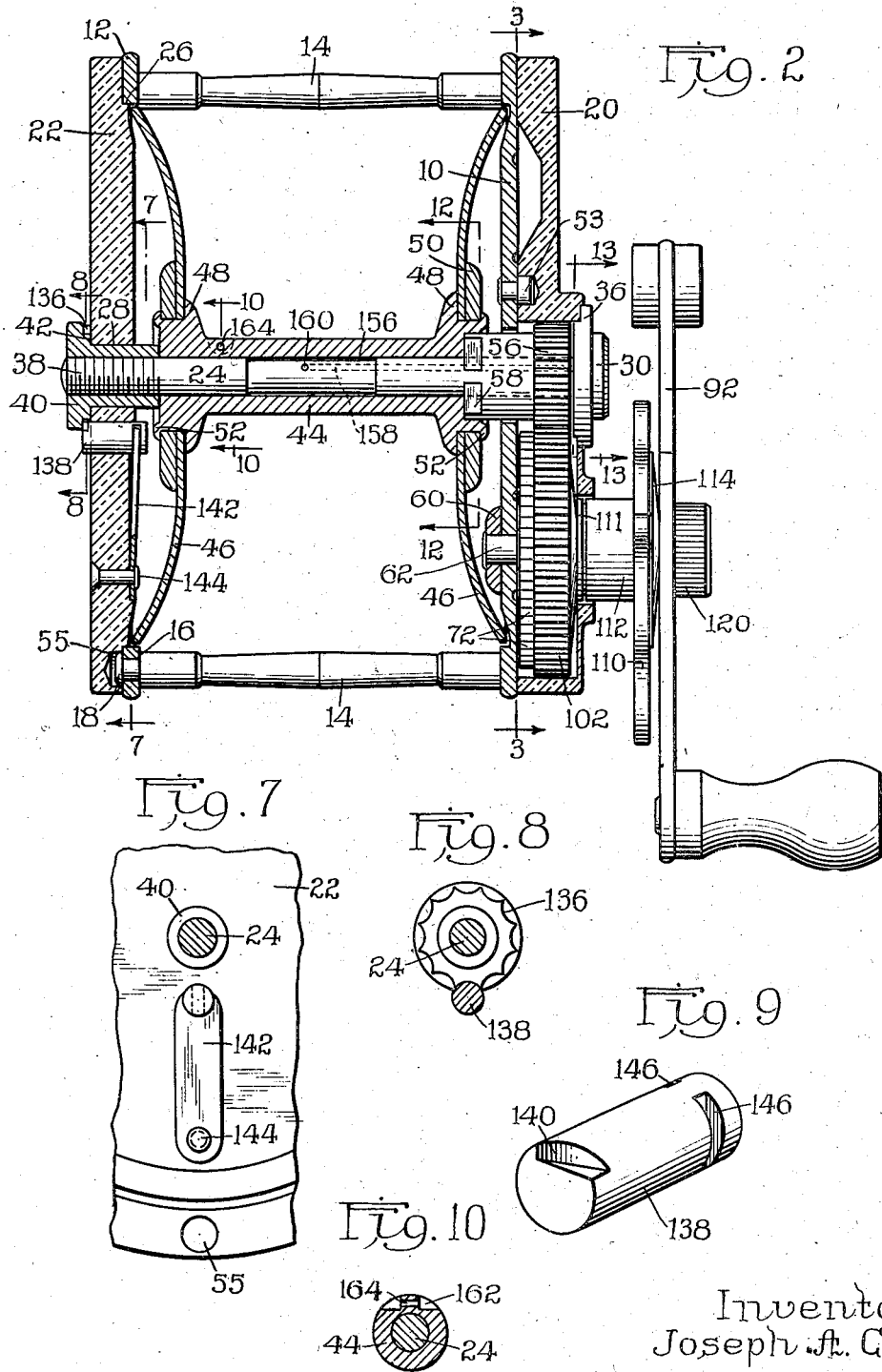

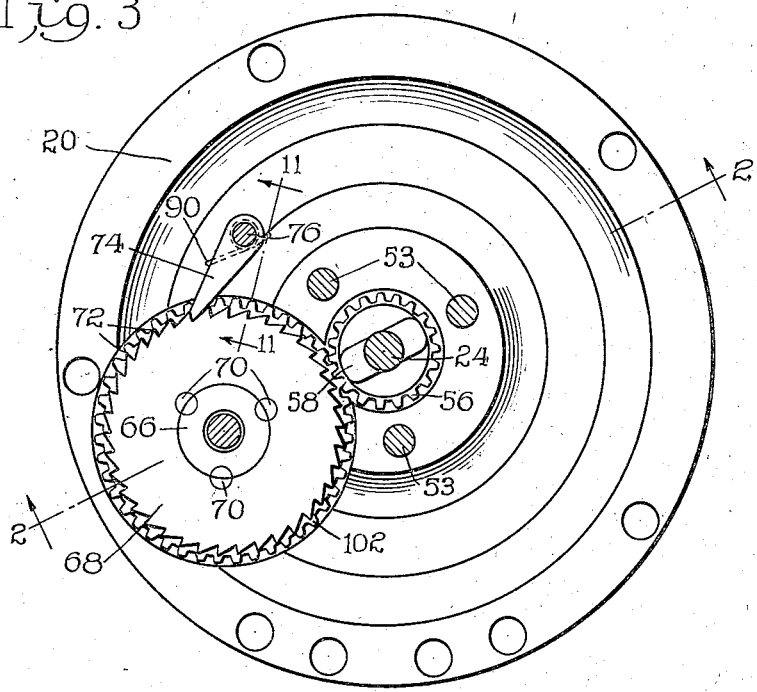
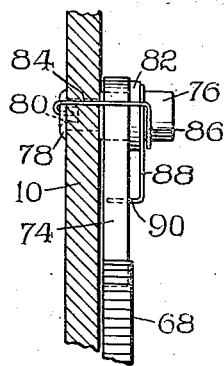
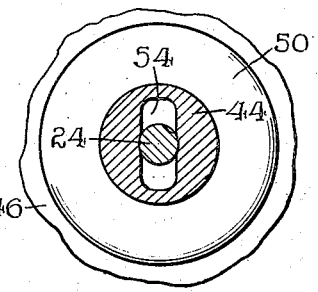
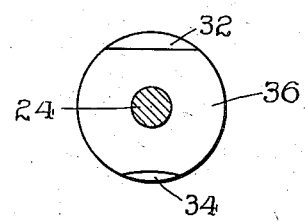

July 30, 1940.  J. A. COXE  2,209,598
FISHING REEL
Filed March 2, 1935  10 Sheets-Sheet 4
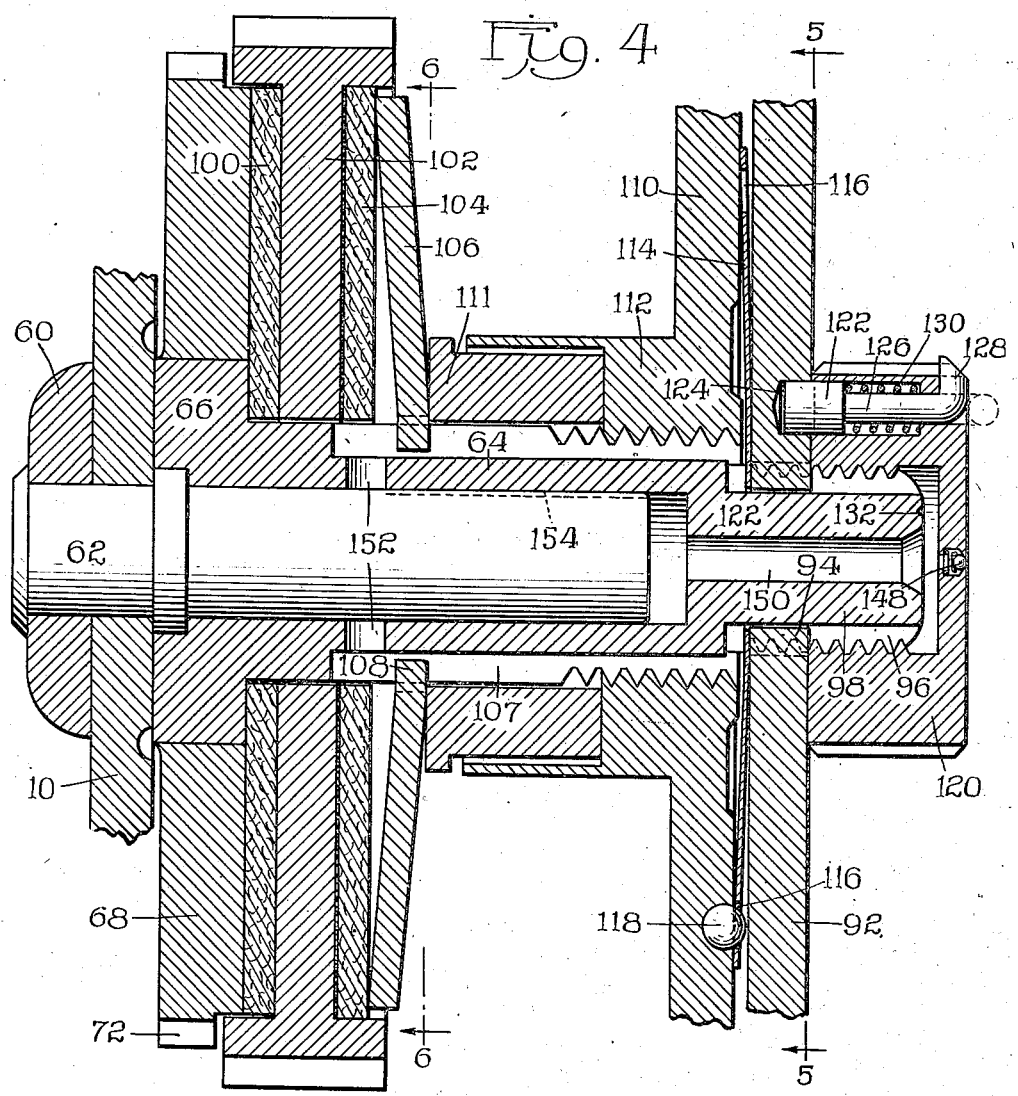
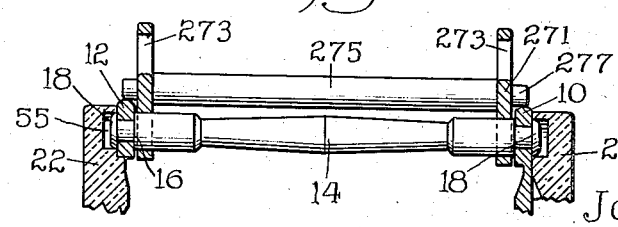
Inventor:
Joseph A. Coxe
By Freeman, Sweet, Albrecht & Wiedman
Attorneys July 30, 1940.  J. A. COXE  2,209,598
FISHING REEL
Filed March 2, 1935    10 Sheets-Sheet 5
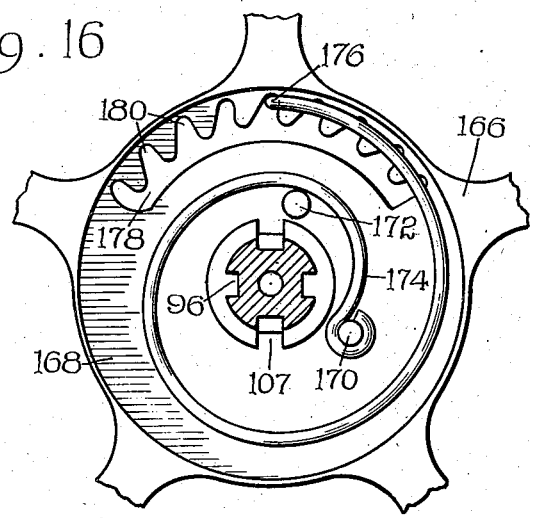
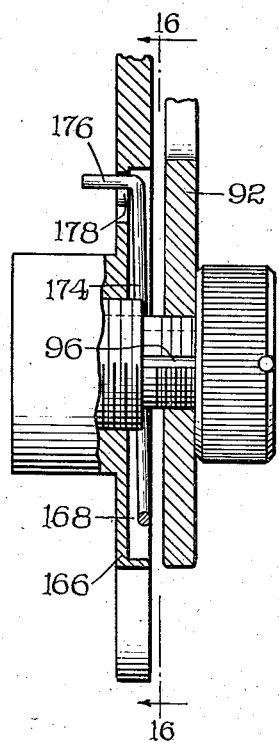
Inventor:
Joseph A. Coxe
By Freeman, Sweet, Albrecht & Weidman
Attorneys

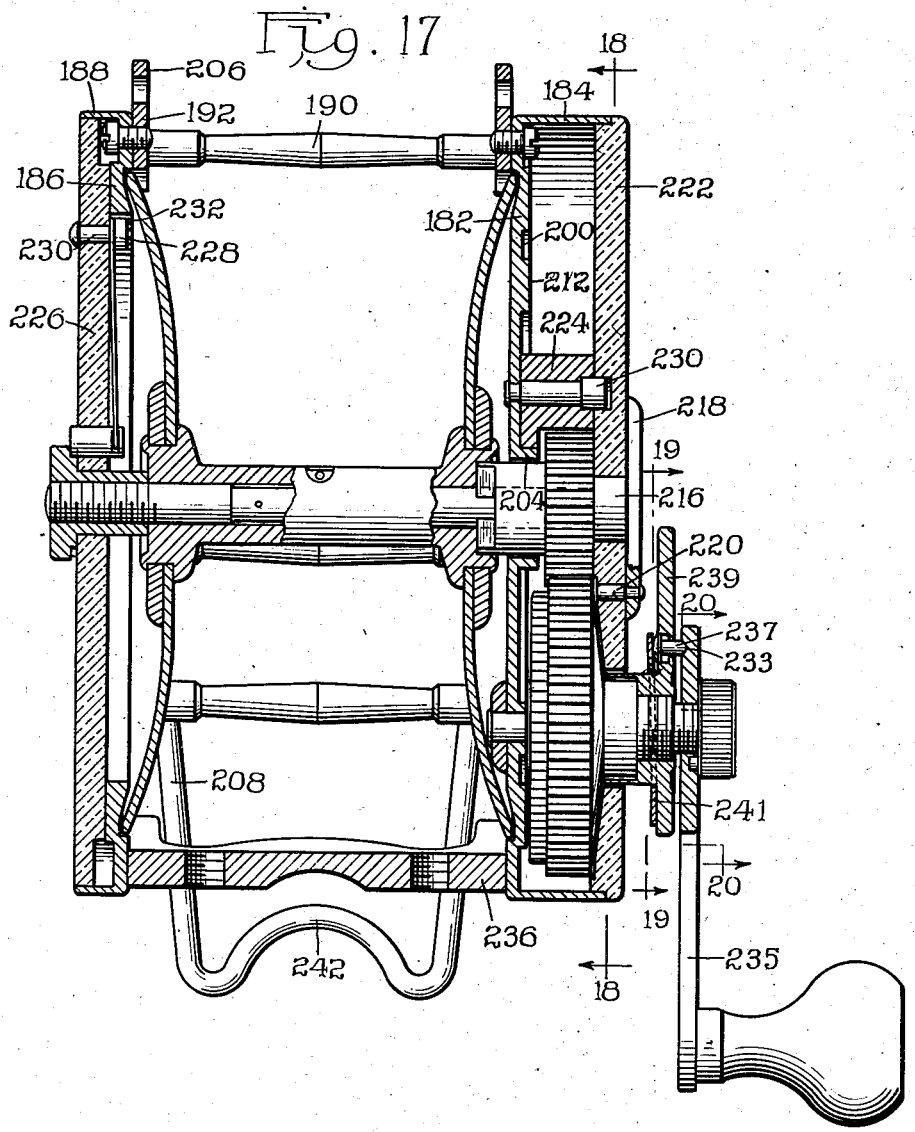

July 30, 1940. J. A. COXE 2,209,598
FISHING REEL
Filed March 2, 1935 10 Sheets-Sheet 7

Inventor:
Joseph A. Coxe
By Freeman, Sweet, Albrecht & Weidman
Attorneys

July 30, 1940.    J. A. COXE    2,209,598
FISHING REEL
Filed March 2, 1935    10 Sheets-Sheet 8
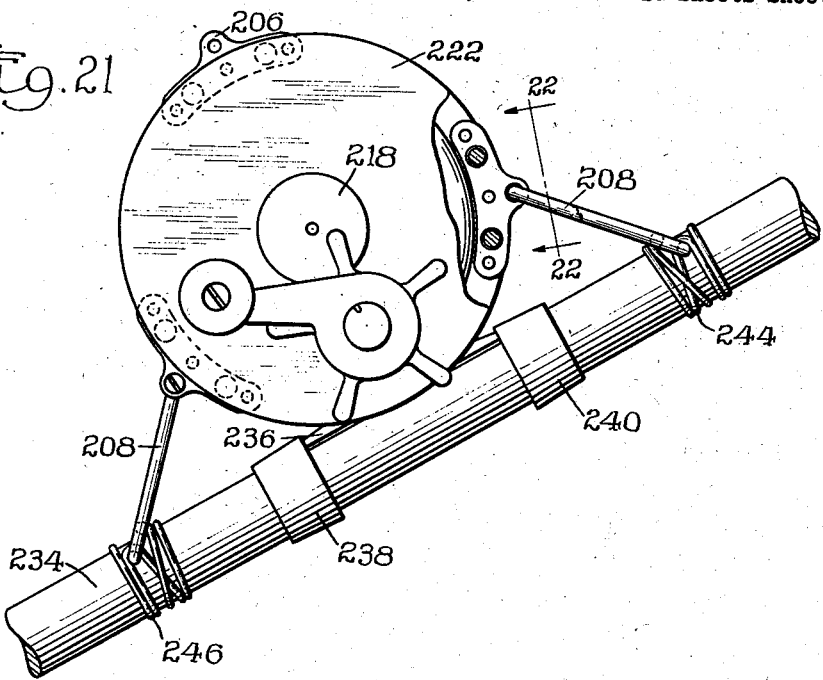
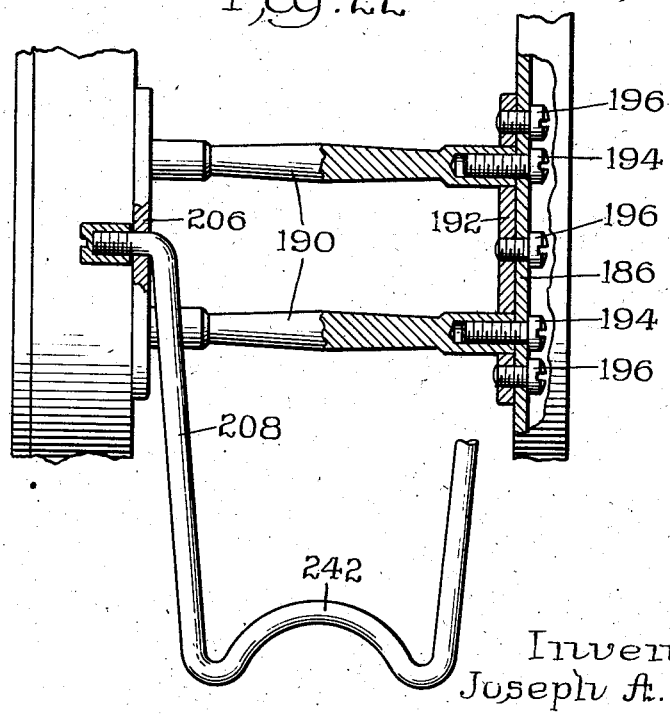
Inventor:
Joseph A. Coxe
By Freeman, Sweet, Albrecht & Weidman
Attorneys

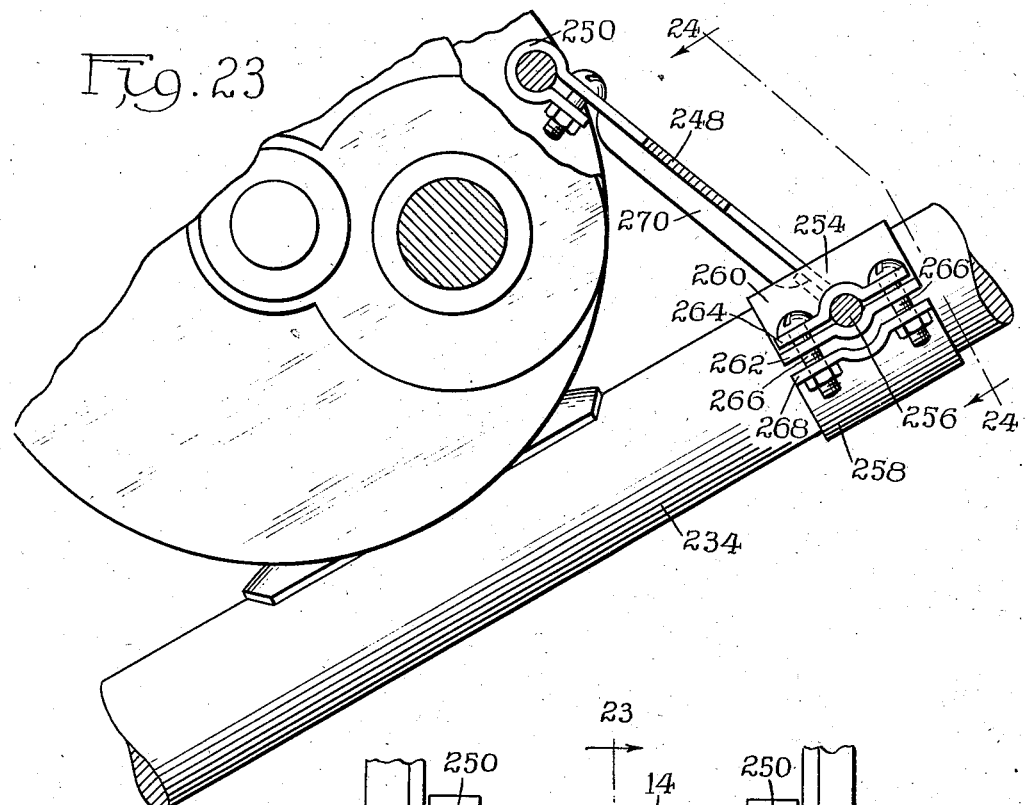
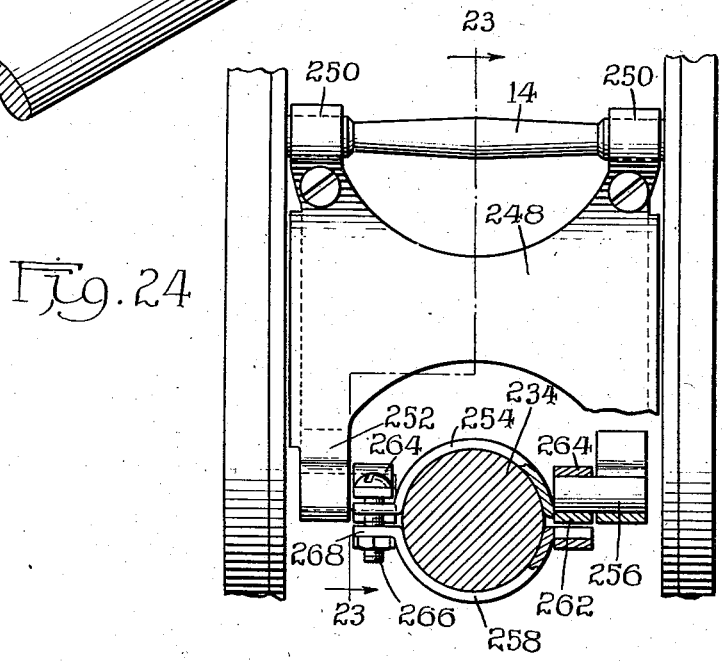

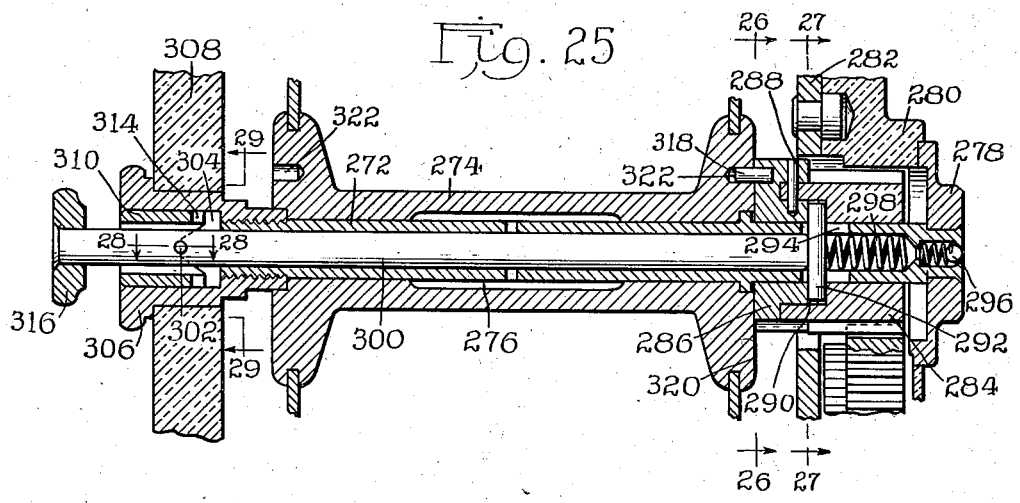

Patented July 30, 1940

2,209,598

UNITED STATES PATENT OFFICE 2,209,598

FISHING REEL

Joseph A. Coxe, Los Angeles, Calif., assignor to Bronson Reel Company, Bronson, Mich., a corporation of Michigan Application March 2, 1935, Serial No. 9,032

29 Claims. (Cl. 242—84.5)

My invention relates to fishing reels and is primarily concerned with the general improvement and strengthening of the basic structure to give its parts the relative strengths they need in use, as distinguished from those needed to make the device excel in performance as a toy on the counter of the store where it is sold. While this is of greater significance in connection with reels for salt water and large fish, most of the novel principles employed are equally applicable to the better class of fresh water reels.

The dominant type of reel in the past has employed a spool shaft with cylindrical projecting ends turning in bearings in the end plates, and, to reduce friction under light loads, the diameters of the end bearings have been maintained at a minimum. Such a reel spins like a top on the counter in the store much more readily than if it were proportioned for the loads of service rather than for those of inspection and display. In such a reel the central portion of the spool shaft is of such rigidity because of its much greater diameter, that each projecting pintle is, in effect, a cantilever, loaded up to nearly its elastic limit whenever the reel is used in playing a sizable fish. Under such circumstances, the main net result of such a type of construction is to increase the quality of fish stories by adding enormously to the number of fish that get away, or that ruin the tackle, or both.

According to the invention, I employ a stationary rigid central shaft, of sufficient diameter to stand all normal working loads with unit stresses below the elastic limit of the material by a substantial margin such that, even if the load were intermittent to the point of being vibrant, as may sometimes happen when the line is cut sideways through the water at such a speed that it sings, no material shortening of the life of the reel need be feared on account of fatigue crystallization.

By using the extra length thus made available to form two long widely spaced bearings, I secure also low unit pressures on the bearing surfaces, with accompanying large increases in the thickness of the oil films that will maintain themselves in the bearings under load by capillary action. And by forming an oil reservoir of substantial size intermediate between the bearings, I maintain the lubrication of the bearings necessary to make the advantages of the low unit loads dependable in every day use. The net result achieved is a reel such that the user need not handle his equipment gingerly whenever he gets a strike, because there is no danger that a few vicious yanks will develop a permanent set in one of the end pintles and tear the reel to pieces, often before even the fish in play is landed.

Such a construction also renders larger and heavier drive and drag mechanism possible without overloading the spool, and makes more precise momentary control of the drag possible and effective, partly because the simplicity of the control adjustment constituting an ancillary object of the invention, permits such adjustment to be made while the fish is in play without preventing the angler from maintaining that constant and alert attention to the tactics of the fish itself which is usually essential to victory.

Ancillary objects include the elimination of all irregularities or projections that might injure or cramp the hands of the user, especially during the ordeal of a protracted contest with a heavy fish; special rod connections that enable the rest of the equipment to stand up to the increased load capacity of the reel; and a free spool arrangement retaining the main advantages of long end bearings and centralized lubrication.

In the accompanying drawing:

Figure 2 is a section of the same embodiment on line 2—2 of Figure 3;

Figure 3 is a section on line 3—3 of Figure 2;

Figure 4 is an enlarged section of the drive shaft;

Figure 1:
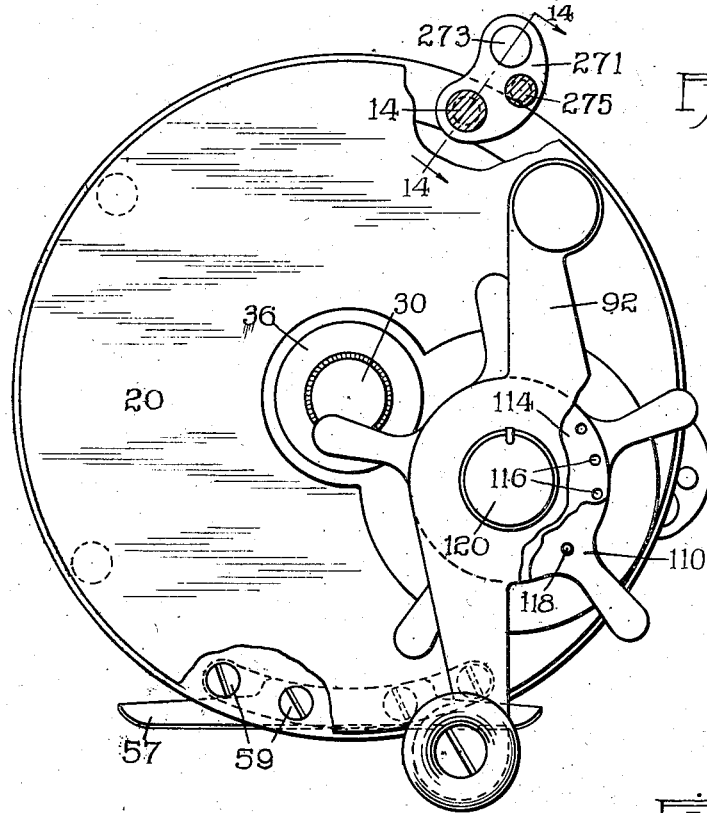
Figure 1 is a side elevation of a reel according to the invention.
Figure 5:
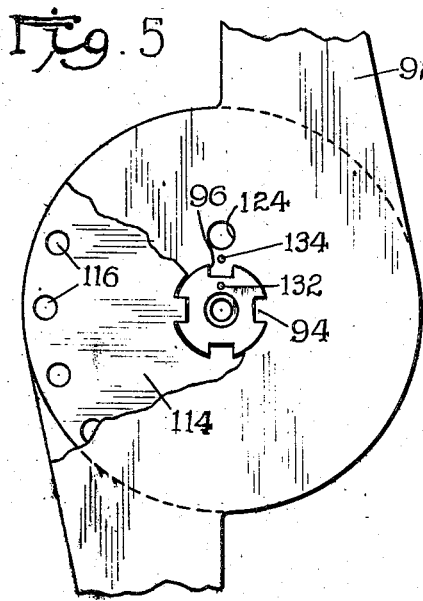
Figure 6:
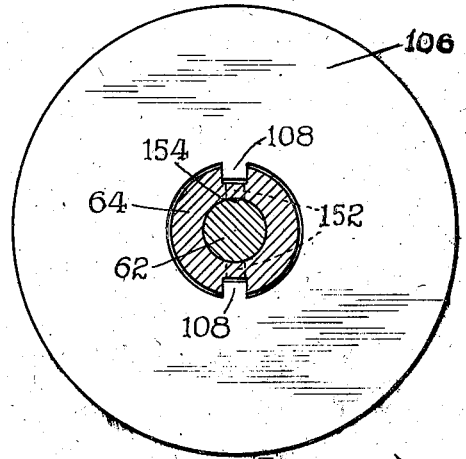
Figure 18:
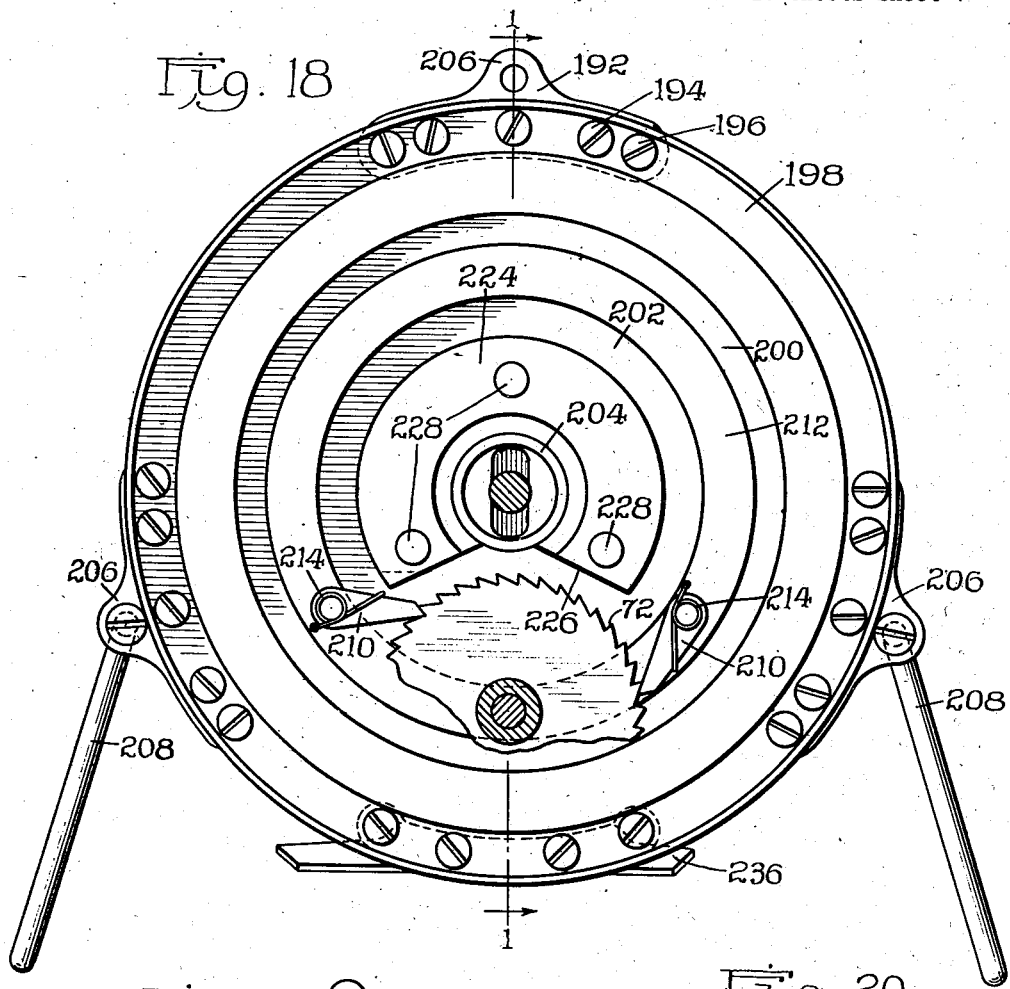
Figure 19:
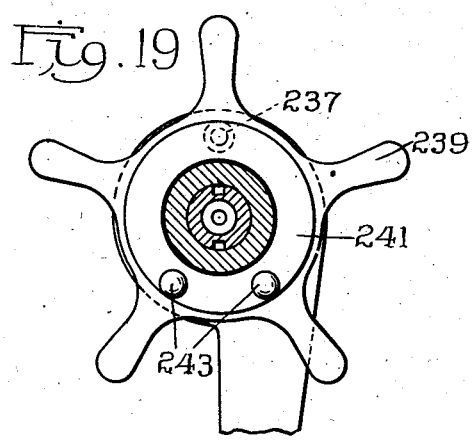
Figure 20:
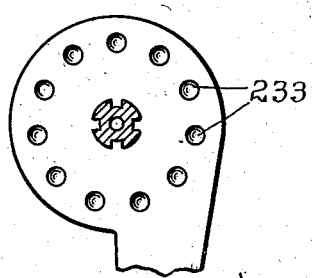

Figures 5 and 6 are detail sections on lines 5—5 and 6—6 of Figure 4;

Figures 7 and 8 are detail sections on lines 7—7 and 8—8 of Figure 2;

Figure 9 is a perspective of the locking pin for the tail plate nut;

Figure 10 is a detail section on line 10—10 of Figure 2;

Figure 11 is a detail section on line 11—11 of Figure 3;

Figures 12 and 13 are detail sections on lines 12—12 and 13—13 of Figure 2;

Figure 14 is a detail section on line 14—14 of Figure 1;

Figure 15 is a partial section on the same plane as Figure 4, illustrating a modified drag control;

Figure 16 is a section on line 16—16 of Figure 15;

Figure 17 is a section similar to Figure 2, showing a modified framework of high rigidity;

Figure 18 is a section on line 18—18 of Figure 17;

Figures 19 and 20 are detail sections on lines 19—19 and 20—20 of Figure 17;

Figure 21 is a side elevation of a reel according to Figure 17, indicating its assembly on a rod;

Figure 22 is a detail section on line 22—22 of Figure 21;

Figure 23 is a partial view on line 23—23 of Figure 24, showing a modified brace;

Figure 24 is a view on line 24—24 of Figure 23;

Figure 25 is a central axial section of a reel using the long central bearing and a free spool control;

Figures 26, 27, 28, and 29 are detail sections on lines 26—26, 27—27, 28—28, and 29—29 of Figure 25.

In the embodiment of the invention selected for illustration in Figures 1 to 14, inclusive, and referring first to Figure 2, the reel illustrated includes a metal headplate 10 and a metal tail ring 12 interconnected around their periphery by a plurality of longitudinal pillars 14, having abutment shoulders at 16, reduced end portions passing through snugly fitting holes in the adjacent end members, and large heads riveted over at 18. A Bakelite cover plate 20 overlies the head plate 10 and is formed with suitable apertures to house and protect the drive mechanism. A Bakelite closure plate 22 has peripheral engagement with the end ring 12 and covers and protects the adjacent end of the spool as well as supporting the end bearing for the stationary shaft 24. The rigidity of such support is assured by the peripheral flange at 26 extending all around the plate and having snug abutment with the ring 12, and by the long central bearing surface at 28 extending entirely through the end plate.

The head 30 of the shaft 24 has notches 32 and 34 in its end surface registering with complementary surfaces in the cover plate 20 to restrain the bolt from rotation. These notches are in an enlarged flange 36 overlying part of the plate 20 to secure an ample thrust bearing. They are of different shape so that the bolt is always assembled in the same position. The tail end of the shaft 24 has a long thread at 38 receiving the tail plate nut 40, which has a shoulder at 42 bearing against the tail plate 22.

The cover plate 20 is originally formed in manufacture in such a way that when the undistorted cover plate 20 is laid against the head plate 10, the centers of the plates are spaced apart by about 0.006 inch while the edges are in contact. Tightening of the nut 40 exerts tension on the shaft 24 until the central portion of the plate 20 is flexed down and thus screwed home against the plate 10.

The spool illustrated is of a built-up construction comprising a main sleeve 44 and end flanges, or bells, 46 clamped in place against shoulders 48 by clamping rings 50. The sleeve 44 includes the integral extensions projecting beyond the shoulders 48 and fitting snugly in the end bells 46 and rings 50, and riveted over peripherally, as at 52.

I orient the cover plate 20 on the head plate 10 by means of three studs 53 entering registering holes in the plate, and I prefer to orient the tail plate 22 also, as by forming sockets 55 registering with the projecting riveted ends 18 of the pillars, or with the heads of the screws 59 that fasten the cross plate 57 in place, or both.

Drive

The head end of the sleeve 44 has a transverse slot 54 milled in it, and the bronze drive pinion 56 includes a tongue 58 entering the slot 54. The plate 10 is reinforced by washer 60 in which is riveted the end of the stud 62 supporting the drive shaft 64. The shaft 64 carries a butt flange 66 united into an integral whole with the annulus 68 as by pins 70 (see Figure 3), driven tightly into holes formed half in the butt flange 66 and half in the annulus 68. This permits the use of different metals for the shaft 64 and the flange 68, to secure the materials that will stand up best. For instance, I prefer to use a shaft 64 of tough phosphor bronze and a flange 68 of hardened steel.

To restrain the shaft against turning movement in the direction of reeling out, I form the usual ratchet teeth 72 on the periphery of the annulus 68 and provide the pawl 74 to engage the teeth.

Referring to Figures 3 and 11, the plate 10 carries a stud 76 riveted into the plate as at 78 with the riveted portion countersunk as at 80. The stud 76 also has a flange 82, and the pawl 74 is confined between the flange 82 and the plate 10. The pawl spring has one end passed through a hole in the plate 10 as at 84, and anchored by extending it back into the countersink 80. At the end of the straight reach at 84 is the convolution 86 passing once around the end of the stud 76 for guidance and resilience. At the end of the convolution 86 is the arm 88 with an end portion 90, turned down to push against the pawl.

Drag

I have illustrated a drive crank 92 having four inwardly projecting keys 94 (see Figures 4 and 5) entering slots 96 broached in the reduced upper end 98 of the drive shaft 64.

Above the flange 68 I position a friction washer 100, the main drive gear 102, and the second friction washer 104. All these parts are free to rotate on the shaft 64 except as they may be frictionally driven. To drive them frictionally I place above the upper friction washer 104 a friction drive plate or washer 106 having two keys 108 axially movable in broached slots 107 in the ful size portion of shaft 64. Above the washer 106 is the thrust sleeve 111, and above the thrust sleeve 111 is the star wheel 110 having a threaded hub 112 engaging suitable threads on the full size portion of the shaft 64. The friction washer 106 is dished to the shape of a cone of very light concavity. I make this concavity such that the manipulation of the star wheel 110 develops sufficient force to flatten the washer 106 completely against the friction washer 104. Thus, for light loads, only the most efficient area at the outer periphery of the friction washer 104 is in action, and the progressive application of greater and greater forces causes the friction area to extend radially inwardly.

Considerable difficulty is encountered by all but the most experienced and expert anglers in gauging the amount of force being exerted on the line by the friction drag while playing the fish. It is frequently necessary to change the amount of friction to suit the exigencies of the moment, and even for the most experienced angler, the control of the amount of friction is a source of constant concern and anxiety during the combat. I have illustrated a thin flexible plate 114 laid between the star wheel 110 and the hub of the drive crank 92, and, like the drive crank, keyed to engage the slots 96. The periphery of this plate has a series of circular apertures 116, and the opposing face of the star wheel 110 is fitted with a contact ball 118 set in a socket in the star wheel. This is a great convenience in playing a fish because before the fish is hooked the star wheel can be set to give the normal friction load considered desirable for the strength of the line and the type of fish involved. Then during the play of the fish, when it becomes necessary to increase or decrease the tension, the operator can give the star wheel one, two, or three clicks or notches of adjustment to change the tension, and when the fish changes tactics, he can count the clicks as he moves back, and by moving back the same number of clicks, get back the normal adjustment he could not otherwise find except by guess.

Obstructions

During the rapid operation of intermittent reelings in, even a light contact of the operator's hands with any irregular knob of obstruction on the tackle becomes, after hundreds of repetitions, extremely annoying and even painful. Referring to Figures 2 and 4, the nut 120 is low with a flat top. It is positively locked against coming unscrewed by a plunger head 122 entering a socket 124 in the drive crank. The plunger head has a shank 126 turned laterally at its upper end to form a hook 128, and the whole plunger is urged into the position of Figure 4 by the compression spring 130 housed in the bore guiding the plunger. In removing the nut, the hook 128 can be lifted and rotated about the axis of the plunger into the dotted line position of Figure 4, and then the nut can be unscrewed. To make sure that the parts are assembled with the right clearance for a suitable operation of the counter plate 114, I indicate by means of a tiny punch at 132 on the end of the shaft 64 and the registering punch 134 on the crank 92, the correct orientation of the crank with respect to the slots 96. As, after the crank is correctly positioned with respect to the slots, a whole turn of the nut 120 is necessary to move it from one locking position to the next locking position, the pitch of the threads on the nut can readily be made such that it is impossible to turn the nut a whole turn too far, and if it is a whole turn too loose, the looseness is decidedly noticeable.

The tail plate nut 40 is also provided with locking means arranged entirely out of the way of the hand of the operator, which may grip or slide over the side of the reel repeatedly while playing the fish.

Referring to Figures 2, 7, 8, and 9, the underface of the flange of the nut 40 is castellated as indicated at 136, and the locking pin 138 is adapted to come to rest in any one of the castellations and lock the nut against unscrewing. The bevelled notch 140 in the operative end of the pin 138 will be engaged by the projections between the sockets when the nut is being screwed home, and thus cam the pin down repeatedly and permit turning of the nut.

The pin 138 is held against rotation and resiliently pressed into operative position by a leaf spring 142 riveted at 144 to the inner face of the tail plate 22 and slotted at its outer end to define a fork, the prongs of which enter slots 146 in the pin 138. To remove the nut 40, merely depress the pin 138 with one fingernail and unscrew the nut with the other hand.

Oiling

Referring to Figure 4, the nut 120 is provided with a spring pressed ball-check oil inlet at 148. The shaft 64 is tubular throughout so that its bore 150 affords a ready access for oil to the capillary clearance space between the stud 62 and the shaft. The oil working down in this way may also work out through radial oil holes at 152 into the space below the friction disc 106 and thus permeate by capillary action throughout the drag mechanism. In some constructions, where capillary action does not let the oil get down to the holes 152 freely enough, I provide a small oil groove 154 in the surface of the stud 62.

Referring now to Figure 2, I have illustrated a central clearance space at 156 between the shaft 24 and the spool sleeve 44. The filling of this space with oil provides a storage immediately adjacent the bearing surfaces between the shaft and sleeve. I have illustrated the space 156 in Figure 2 as formed by reducing the diameter of the shaft, but wherever considerations of shaft strength make it desirable to maintain a full diameter shaft, it will be obvious that the chamber could be formed by enlarging the inner bore of the sleeve 44. The oil supply to the space 156 may come from either end of the shaft 24. In Figure 2 I have indicated at 158 an oil feed passage debouching at 160 and extending to the right toward the head 30 which may be provided with an oil inlet of any suitable type, for instance one identical with that shown at 148 in Figure 4. In Figure 10 I have illustrated a concealed line attachment means formed by cutting away notches at 162 and boring a small hole 164 through the resultant rib in the sleeve 44.

Adjustable set drag

Referring to Figures 15 and 16, I have illustrated means for automatically maintaining a predetermined or "normal" drag, which means can be automatically adjusted to different values from time to time, even while playing a fish. The star wheel 166 is formed with a shallow recess 168 opening toward the crank 92. In the recess I house a spiral wire spring 174 attached at 170 to the under face of the crank 92 and preferably with an abutment pin 172 spaced from the anchor pin 170 to afford the spring a suitable fulcrum. The outer end of the spring 174 is turned down at 176 and passes through an arcuate slot 178 in the star wheel 166. The tension of the spring urges the end 176 both radially outwardly and in a clockwise direction as viewed in Figure 16, and the outer edge of the slot 178 is serrated to provide a plurality of radial notches 180 into any one of which the projections 176 may enter and in which the projection will be held in place by the spring tension.

In using such a drag, before the strike, the user may position the projection 176 in the notch desired for automatically maintaining a predetermined or normal amount of tension on the line. Then during a run he can increase the tension temporarily by merely pushing on the projections of the star wheel to urge it in a clockwise direction as viewed in Figure 16. In this way he can increase the friction of the drag to any desired extent, beyond that caused by the spring 174. The increased friction thus established is accompanied by a heavy axial load that locks the star wheel in adjusted position against the force of the spring 174. But the original setting can be quickly restored by turning the star wheel counter clockwise a little past its initial position and then letting go. The spring 174 then immediately restores the original setting. Similarly, if he desires to have less than the normal drag, as, for instance, if the fish is too close to the boat and he wants it to take a long run and get farther away, gentle force on the star wheel in a counter clockwise direction will overcome the spring force and reduce the drag to any desired extent. And he can also, with the tip of his finger thrust behind the star wheel, poke the projection 176 out of the notch it happens to be in and, at a slight angle in either direction so that it will snap over the adjacent projection and into the next notch on either side of the previous notch. This changes the "normal" drag setting.

Closed frame

Referring now to Figures 17 and 18, I have illustrated a spool constructed identically with that of Figure 2, but the head plate 182 is a casting in the form of a deep cup with flanges at 184. And the tail ring 186 may also be a casting with similar flanges at 188. To further increase the strength and rigidity of the frame for the heaviest work, the pillars 190 are interconnected in pairs, as best illustrated in Figure 22. The cast plates 192 receive the ends of the pillars and the whole assembly is screwed home hard against the adjacent end plate or ring by two long screws 194 threaded into the pillars, and three short screws 196 bracing the plate 192 against the adjacent end plate. To secure greater strength in proportion to the weight of the head plate 182 I form annular grooves in it leaving annular reinforcing ribs between the grooves. Referring to Figure 18, one such groove at 198 receives the fastening screws for the reinforcing plates 192. The next groove is at 200 and the last grove at 202 extends in close to the hub 204 (see Figure 17) adjacent the central drive mechanism.

All the bracing plates 192 are provided with central ears 206 projecting outwardly. Certain of these ears afford pivotal support for rod braces 208, and the ears at the top of the reel afford points of attachment for the harness usually worn when using such a reel, which is strapped around the shoulders of the angler to enable him to throw the entire weight of his body into his efforts to hold the fish.

The drive for the reel of Figures 17 and 18 may be generally identical with that for the reel of Figures 1 and 2. However, for the heavier loads, I have indicated in Figure 18 a special pawl arrangement reducing the amount of backlash between successive held positions of the ratchet of the drive shaft. The pawls 210 are pivoted on the land 212 between the grooves 200 and 202 and urged into locking position by springs 214 which may be identical with the spring of Figure 11. But it will be noted on referring to Figure 18 that the pawl on the left is in abutment with one of the ratchet teeth 72, whereas the pawl on the right is half way between one tooth and the next. Obviously, each tooth must be strong enough to carry the maximum force to which the parts may be subjected, and of course this imposes a minimum limit for the size of the teeth. But by the use of two pawls acting in alternation as above disclosed, the angular clockwise movement of the teeth 72 of Figure 18 from the position illustrated until they come to rest in the next held position is only half the angle between one tooth and the next tooth. The bolt 216 may be identical at its tail end with the bolt 24 of Figure 2. To reduce clearances and projections, its head end is a flat flange 218 carrying a pin 220 entered in a registering opening in the cover plate 222 to hold the bolt against rotation. To carry the bolt tension, and at the same time minimize the weight of the device, I provide an aluminum spacer block 224 cut away at 226 (see Figure 18) to leave clearance for the adjacent drive mechanism, and fastened by three studs 228, which studs also project above the top of the block at 230 to register with holds in the cover plate 222 and orient the cover plate. I prefer to orient the tail plate 226 by letting the inner end 228 of the rivet 230 for the lock on the tail nut enter notch 232 in the inner edge of the adjacent tail ring 186.

The drag mechanism of the reel of Figures 17 and 18 is provided with counting means operating on the same principles as that of Figure 4, but, as clearly indicated in Figure 17, the series of sockets 233 are formed in the under surface of the crank plate 235, and the socket engaging means is a pin 237 axially slidable through the star wheel 239 and resiliently pressed toward the crank handle by an annular leaf spring 241, riveted to the under side of the star wheel, as at 243.

Braces and harness

The use made of the braces 208 is more clearly indicated in Figure 21 which illustrates diagrammatically a rod 234 on which the seat plate 236 of the reel rests, held in place by the usual rings 238 and 240. To avoid concentrating the mechanical load on the rod at this point of attachment alone, the braces 208 each terminate in a semi-circular re-entrant bight 242, and the braces are first positioned as in Figure 21 and then their remote ends are securely lashed in abutment with the rod as by lashings at 244 and 246. This reinforcement materally assists the rod from a mechanical point of view.

Referring now to Figures 23 and 24 I have indicated a brace 248 formed of a flat piece of sheet metal with ears at 250 bent around to form loops engaging the pillar 14, and ears 252 similarly bent back and spotwelded as at 254 with stub shafts 256 preferably fastened in permanently by the same welding. With a brace of this sort the rod 234 is encircled by two U-shaped clips 258 and 260. The stub shafts 256 overlie the adjacent flanges 262 on the upper clamp member 260, and fastening clips 264 are positioned above the stub shafts 256. It will be apparent that tightening of the bolts 266 will pull the clips 264 down against the stub shafts 256, and the stub shafts will in turn press down on the flanges 262 so that the bolt tension pulling up on the flanges 268 of the lower clip 258 and down on the upper clips 264 clamps the clips on the rod and the stub shafts against the clips to brace the entire structure. The side edges of the plate 248 are turned down at 270 to increase the rigidity and strength of the plate. Such a plate brace can be attached to any reel having a pillar at the proper point.

When the ears 206 are available, the angler's shoulder harness may be hooked directly into them. When using plain pillars 14, I provide a pair of plate links 271, best shown in Figures 1 and 14. Each plate link encircles the pillar 14 and has an eye 273 at its other end to receive the harness. The plate links are interconnected by a cross brace 275 having ends 277 projecting into the planes of the end plates. This strengthens the structure against a diagonal pull, prevents the plate links from swinging into contact with the spool or line, and helps the user get hold of the parts in hooking on the harness.

Free spool

In Figures 25 to 29, inclusive, I have indicated one way in which the main advantages of my invention can be included in a free spool reel. The main reel shaft 272 of Figure 25 is tubular, and the sleeve 274 is mounted on it in the same way as in Figure 2 except that the oil chamber 276 is formed in the sleeve to leave the shaft of full cross section and maximum strength throughout. At the head end, the shaft 272 is integrally united with a head 278 overlying the cover plate 280 and compressing it against the head end plate 282. The drive pinion 284 is provided with a separate clutching extension 286 fastened to it by radial pins 288. Between the extension and the pinion proper is the annular groove 290 in which lies the non-rotating pin 292 extending transversely through slots 294 in the shaft 272. The shaft 272 is provided with a suitable oil inlet at 296, and beyond that with a chamber housing a spring 298 normally urging the pin 292 to the left into the position shown in Figure 25. A loosely fitting thrust pin 300 extends through to the other side of the reel, being limited in axial movement by a cross pin 302, the ends of which lie in the annular space 304 in the tail plate nut 306, which has the previously described long bearing in the tail plate 308. The sleeve 310 is rigid with the tail plate nut 306 and has a cam-shaped edge abutting the ends of the cross pin 302 to control the axial positioning of the thrust pin 300. The cam shape includes the deep pocket 312, deep enough to let the parts move into the position of Figure 25, and a shallow pocket 314, shaped to fit the pin 302 and hold the parts in free spool position. The thrust pin 300 carries an integral projecting head 316. It will be apparent that by grasping the head 316 and pushing the thrust pin to the right from the position of Figure 25, at the same time rotating the thrust pin through 90°, the end of the pin will be set up in the cam notches 314 and the spool will be left free. Whenever the user wishes to throw in the clutch, he merely turns the head 316 a trifle, and the pin 300 will rotate on its axis to let the pin 302 move down into the deep cam slots 312. This will not occur, however, until some load is placed on the transmission. Instead, the clutch pins 318 in the clutch will abut against the flat face of the spool sleeve as at the point indicated by reference character 320 in Figure 26, and this abutment will carry the force of the spring 298 until enough load is put on the transmission to cause the pins to slip around and enter the registering pockets 322 in the spool sleeve. When this happens, the parts will move to the position of Figure 25, putting the clutch in mesh and affording a positive drive. The friction load on the pins is ordinarily enough to rotate the crank handle until the angler takes hold of it, and then the clutch slips in. I have illustrated the spool sleeve 274 symmetrical about a transverse central plane with pockets 322 on both ends, and this permits reversing the spool end for end in case of wear. As the pin 300 fits loosely in the tubular shaft 272, the oil entering at 296 finds its way readily into the oil reservoir 276.

Without further elaboration, the foregoing will so fully explain my invention, that others may, by applying knowledge current at the time of application, readily adapt the same for use under various conditions of service.

I claim:

1. In a fishing reel, in combination: spaced stationary head end and tail end members; a stationary shaft fixedly mounted in said end members; a spool including a sleeve and spaced end flanges adjacent said end members; said shaft and sleeve having bearings adapted to receive lubricant; said tail end member including a ring and a removable plate; said shaft operating in tension to hold said plate assembled; removal of said plate permitting removal of said spool through said ring; a drive pinion rotatably supported by said shaft; and clutch faces on said drive pinion and sleeve to permit separation of said spool and pinion.

2. In a fishing reel, in combination: spaced stationary head end and tail end members; a stationary shaft fixedly mounted in said end members; a spool including a sleeve and spaced end flanges adjacent said end members; said shaft and sleeve having adjacent surfaces shaped to define spaced end bearings and a clearance between said bearings adapted to receive lubricant; said tail end member including a ring and a removable plate; said shaft operating in tension to hold said plate assembled; a drive pinion rotatably supported by said shaft; clutch faces on said drive pinion and sleeve to permit separation of said spool and pinion; and a removable head housing, held in place by the shaft tension.

3. In a fishing reel, in combination: a frame; a spool; a transmission for driving said spool, including a crank handle and adjustable friction drag means independent of said handle; manual control means for adjusting the amount of friction, tending to remain in adjusted position without attention by the operator except for readjusting to a different amount; and indicator means enabling the operator to determine the amount of any readjustment, and to return at will to the original adjustment; said indicator means comprising resilient biasing means tending to hold said control means in any one of a plurality of consecutive positions of adjustment, whereby the operator can count the number of steps in any readjustment and return to the original adjustment by counting the same number of steps in readjusting back to the original position.

4. In a fishing reel, in combination: a frame; a spool; a transmission for driving said spool, including adjustable friction drive means; control means for controlling the amount of friction; resilient means acting on said control means and tending to maintain the friction at a predetermined value; manual adjustment means also acting on said control means for increasing or decreasing the friction, with respect to said predetermined value; said control means, when adjusted to produce friction in excess of said predetermined value, having a binding action greater than the force of said resilient means, whereby adjustment to more than the predetermined value will be maintained until changed by the operator; the binding action being otherwise less than the force of said resilient means, whereby said predetermined value can be found again by manual adjustment to a value below the predetermined value, and subsequent manual release; and manual means accessible during use of the reel, for adjusting the tension of said resilient means to set it for a different predetermined value.

5. In a fishing reel, in combination: a frame; a spool; a transmission for driving said spool, including adjustable friction drive means; control means for controlling the amount of friction; resilient means acting on said control means and tending to maintain the friction at a predetermined value; manual adjustment means also acting on said control means for increasing or decreasing the friction, with respect to said predetermined value; and manual means accessible during use of the reel, for adjusting the tension of said resilient means to set it for a different predetermined value.

6. In a fishing reel, in combination: a frame; a spool; a transmission for driving said spool, including adjustable friction drive means; control means for controlling the amount of friction; resilient means acting on said control means and tending to maintain the friction at a predetermined value; manual adjustment means also acting on said control means for increasing or decreasing the friction, with respect to said predetermined value; said control means, when adjusted to produce friction in excess of said predetermined value, having a binding action greater than the force of said resilient means, whereby adjustment to more than the predetermined value will be maintained until changed by the operator.

7. In a fishing reel, in combination: a frame; a spool; a transmission for driving said spool, including adjustable friction drive means; control means for controlling the amount of friction; resilient means acting on said control means and tending to maintain the friction at a predetermined value; manual adjustment means also acting on said control means for increasing or decreasing the friction, with respect to said predetermined value; said control means, when adjusted to produce friction in excess of said predetermined value, having a binding action greater than the force of said resilient means, whereby adjustment to more than the predetermined value will be maintained until changed by the operator; and manual means accessible during use of the reel, for adjusting the tension of said resilient means to set it for a different predetermined value.

8. In a fishing reel, in combination: an axially extending shaft; a fastening nut on the end of said shaft; said nut having a substantially smooth end face; and spring pressed locking means when in locking position located entirely within the plane of said end face, for positively preventing unscrewing of said nut; said locking means including an axially slidable locking bolt and a spring engaging said bolt near one end thereof and pressing it toward locking position; said nut having an inwardly facing shoulder with a castellated edge; the end of said bolt lying in the path of said castellations and having a ratchet shape.

9. In a fishing reel, in combination: an axially extending shaft; a fastening nut on the end of said shaft; said nut having a substantially smooth end; and spring pressed locking means when in locking position located entirely within the plane of said nut end, for positively preventing unscrewing of said nut; said locking means including an axially slidable locking bolt and a spring engaging said bolt near one end thereof and pressing it toward locking position.

10. In a fishing reel, in combination: an axially extending shaft; a fastening nut on the end of said shaft; said nut having a substantially smooth end; and spring pressed locking means when in locking position located entirely within the plane of said nut end, for positively preventing unscrewing of said nut; said locking means including an axially slidable locking bolt housed in said nut, and a spring engaging said bolt and pressing it toward locking position.

11. In a fishing reel, in combination: head and tail end members; and braces uniting said members into a rigid frame; said braces including retangular sub-frames; each sub-frame having end plates attached at a plurality of spaced points to the adjacent end members; certain of said end plates having outwardly projecting ears apertured to receive attachments for connecting the reel frame to the angler or the rod.

12. In a fishing reel, in combination: head and tail end members; and braces uniting said members into a rigid frame; said braces including retangular sub-frames; each sub-frame having end plates attached at a plurality of spaced points to the adjacent end members.

13. In a fishing reel, in combination: head and tail end members; and braces uniting said members into a rigid frame; said braces including rectangular sub-frames; each sub-frame including a plurality of pillars extending across between said head and tail end members.

14. An attachment clip for reels of the type comprising a frame made up of end members and pillars bracing said end members, comprising, in combination: a clip pillar; and clip plates carried by the ends of said clip pillar; each clip plate having an end aperture encircling one end of a frame pillar; and another end aperture adapted to receive an attachment; said clip pillar extending beyond said clip plates, the extended portions of said clip pillar being positioned to engage portions of the reel frame and limit the rotation of the clip around its frame pillar.

15. An attachment clip for reels of the type comprising a frame made up of end members and pillars bracing said end members, comprising, in combination: a clip pillar; and clip plates carried by the ends of said clip pillar; each clip plate having an end aperture encircling one end of a frame pillar; and another end aperture adapted to receive an attachment.

16. In a fishing reel, in combination: a metal frame including an end plate; a Bakelite cover and housing plate overlying said end plate and having a peripheral flange and a central boss; said housing plate, in undistorted condition, having its central boss slightly spaced from said end plate; and tension means acting to pull said central boss into contact with said end plate.

17. In a fishing reel, in combination: a drive shaft having an integral end flange extending outwardly; an annular extension flange encircling said shaft flange; key means preventing relative rotation of said flanges; and friction drive means including a friction washer rubbing on both flanges; said extension flange being of different material from said shaft flange.

18. In a fishing reel, in combination: spaced head and tail end members; a stationary tubular shaft fixedly mounted on said end members; a spool between said end members, including a sleeve having end bearing portions rotatable on said shaft, and a clearance adapted to hold lubricant between said bearing portions; clutch means encircling said shaft at the head end and axially movable into and out of clutching engagement with said spool for driving the same; a clutch actuating rod inside said shaft extending beyond the tail end of said shaft and accessible at the tail end for manual actuation; and a cross pin at the head end, said shaft being slotted to permit said cross pin to extend radially outward into contact with said clutch; a compression spring housed in said shaft on the head end side of said cross pin to urge the pin and clutch to closed position; and cam means in the tail end member for holding the rod against axial movement, with the clutch open.

19. In a fishing reel, in combination: spaced head and tail end members; a stationary tubular shaft fixedly mounted on said end members; a spool between said end members, including a sleeve rotatable on said shaft; clutch means encircling said shaft at the head end and axially movable into and out of clutching engagement with said spool for driving the same; and a clutch actuating rod inside said shaft extending beyond the tail end of said shaft and accessible at the tail end for manual actuation.

20. In a fishing reel, in combination: spaced head and tail end members; a metal spool rotatably mounted between said end members; a clutch at one end for driving said spool; and cooperating clutch faces formed in duplicate on opposite ends of said spool; said spool being symmetrical to permit reversing it end for end by the user.

21. In a fishing reel including a frame, and a spool: means for driving said spool including a manually operable drive crank; a friction drive transmission for connecting said crank and spool; control means independent of said crank for varying the friction; said control means being manually accessible to the operator for effecting temporary variations in the friction at any time; and resilient means acting on said control means and tending to maintain the friction at a predetermined value when the operator is not manipulating said control means.

22. A combination according to claim 21 in which said control means includes parts having a locking action more powerful than said resilient means whenever set by the operator for a greater friction value than said predetermined value.

23. In a fishing reel, in combination: spaced head and tail end members; a stationary shaft fixedly mounted on said end members; a spool between said end members, including a sleeve having end bearing portions rotatable on said shaft; said shaft and sleeve having portions of different diameters between said bearing portions to define a clearance space for storing lubricant.

24. In a fishing reel, in combination: an axially extending shaft; a fastening nut on the end of said shaft; an end plate through which said shaft passes and against which said nut bears; and spring pressed locking means carried by said plate for locking said nut; said locking means including a bolt slidable in said plate parallel to the shaft axis; the outer end of said bolt engaging the inner face of said nut.

25. In a fishing reel, in combination: a drive shaft; a gear coaxial with said drive shaft and rotatable with respect thereto; said gear having a continuous web presenting flat annular surfaces on both sides; friction washers lying adjacent said web on both sides thereof; a one piece resilient cupped metal washer overlying one of said friction washers; said metal washer having integral inwardly projecting lugs; said shaft having spline grooves receiving said lugs; and adjustable means for pressing said resilient metal washer against said friction washer.

26. In a fishing reel, in combination: spaced head and tail end members; a stationary tubular shaft fixedly mounted on said end members; a spool between said end members, including a sleeve rotatable on said shaft; clutch means encircling said shaft at the head end and axially movable into and out of clutching engagement with said spool for driving the same; and a clutch actuating rod inside said shaft for actuating said clutch.

27. In a fishing reel, in combination: a frame; a spool journaled in said frame; transmission for rotating said spool including separable clutch members; biasing means tending to engage said clutch members; and control means for supporting said clutch members against the force of said biasing means; said control means including a manual control element movable into one free spool position to hold said clutch members disengaged, and into a position on either side of free spool position to hold said clutch members engaged; and cam means subject to the force of said biasing means and tending to hold said element in any one of said positions; whereby displacement of said element in either direction from free spool position will cause said clutch members to engage.

28. In a fishing reel, in combination: a frame; a spool journaled in said frame; transmission for rotating said spool including separable clutch members; biasing means tending to engage said clutch members; and control means for supporting said clutch members against the force of said biasing means; said control means including a manual control element movable into one free spool position to hold said clutch members disengaged, and into a position on either side of free spool position to hold said clutch members engaged; and means tending to hold said element in any one of said positions; whereby displacement of said element in either direction from free spool position will cause said clutch members to engage.

29. In a fishing reel, in combination: a drive shaft; a gear coaxial with said drive shaft and rotatable with respect thereto; said gear having a continuous web presenting flat annular surfaces on both sides; friction washers lying adjacent said web on both sides thereof; a one piece resilient cupped metal washer overlying one of said friction washers; said metal washer having a splined connection with said drive shaft; and adjustable means for pressing said resilient metal washer against said friction washer.

J. A. COXE.